US008856122B2

(12) United States Patent
Hughes, Jr.

(10) Patent No.: US 8,856,122 B2
(45) Date of Patent: *Oct. 7, 2014

(54) CONTENT PACKAGE FOR ELECTRONIC DISTRIBUTION

(71) Applicant: Microsoft Corporation, Redmond, WA (US)

(72) Inventor: Robert K. Hughes, Jr., Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/040,655

(22) Filed: Sep. 28, 2013

(65) Prior Publication Data

US 2014/0032497 A1 Jan. 30, 2014

Related U.S. Application Data

(63) Continuation of application No. 12/480,687, filed on Jun. 9, 2009, now Pat. No. 8,548,946.

(60) Provisional application No. 61/105,410, filed on Oct. 14, 2008.

(51) Int. Cl.
*G06F 17/30* (2006.01)
(52) U.S. Cl.
CPC .... *G06F 17/30017* (2013.01); *G06F 17/30053* (2013.01); *G06F 17/3002* (2013.01)
USPC ........................................................ 707/736
(58) Field of Classification Search
USPC ........................................................ 707/770
See application file for complete search history.

(56) References Cited

U.S. PATENT DOCUMENTS 4,584,611 A * 4/1986 Katahira ...................... 358/483
6,640,305 B2 10/2003 Kocher et al.
(Continued)

FOREIGN PATENT DOCUMENTS

EP 1944710 A1 7/2008
JP 2002-334000 A 11/2002
(Continued)

OTHER PUBLICATIONS

"China Third Office Action", Mailed Date: Sep. 26, 2013, Application No. 200980141456.7, 7 pages.
"Information about the Multimedia File Types that Windows Media Player Supports", Retrieved at<<http://support.microsoft.com/kb/316992>>, May 12, 2008, 11 pages.
(Continued)

*Primary Examiner* — Baoquoc N To
(74) *Attorney, Agent, or Firm* — Timothy Churna; Kate Drakos; Micky Minhas

(57) ABSTRACT

Defining a content package having media files and table of contents (TOC) data. The content package includes physical representation data and logical representation data for the media files (e.g., stored in the TOC data). Computing devices store, download, and play back the media files based on the data in the content package. Presentations (e.g., collections of files) within the content package are available for extraction based on a configuration of a media player. The media files are provided for presentation to a user of the computing device, or for storage by the computing device.

20 Claims, 5 Drawing Sheets

(56) References Cited

U.S. PATENT DOCUMENTS

| | | | |
|---|---|---|---|
| 6,687,211 B2* | 2/2004 | Sawabe et al. | 369/275.3 |
| 6,829,368 B2 | 12/2004 | Meyer et al. | |
| 6,859,421 B2* | 2/2005 | Sawabe et al. | 369/30.01 |
| 6,965,727 B1* | 11/2005 | Sawabe et al. | 386/248 |
| 7,003,533 B2 | 2/2006 | Noguchi et al. | |
| 7,046,914 B2 | 5/2006 | Jasinschi et al. | |
| 7,136,866 B2* | 11/2006 | Springer et al. | 1/1 |
| 7,162,690 B2 | 1/2007 | Gupta et al. | |
| 7,184,653 B2 | 2/2007 | Evans | |
| 7,499,930 B2 | 3/2009 | Naka et al. | |
| 8,387,124 B2* | 2/2013 | Smetters et al. | 726/9 |
| 2002/0101804 A1* | 8/2002 | Sawabe et al. | 369/47.24 |
| 2002/0138593 A1 | 9/2002 | Novak et al. | |
| 2002/0138852 A1 | 9/2002 | Reynolds et al. | |
| 2003/0123351 A1* | 7/2003 | Sawabe et al. | 369/47.24 |
| 2004/0034650 A1* | 2/2004 | Springer et al. | 707/102 |
| 2004/0049395 A1 | 3/2004 | Gaya | |
| 2005/0123281 A1* | 6/2005 | Sawabe et al. | 386/96 |
| 2005/0232111 A1* | 10/2005 | Sawabe et al. | 369/59.25 |
| 2005/0248790 A1 | 11/2005 | Ornstein et al. | |
| 2007/0073767 A1* | 3/2007 | Springer et al. | 707/103 R |
| 2007/0192352 A1 | 8/2007 | Levy | |
| 2007/0201502 A1 | 8/2007 | Abramson | |
| 2007/0226238 A1 | 9/2007 | Kiilerich et al. | |
| 2008/0140660 A1 | 6/2008 | Masuda et al. | |
| 2008/0165956 A1 | 7/2008 | Zhu et al. | |
| 2008/0229402 A1* | 9/2008 | Smetters et al. | 726/9 |
| 2009/0275404 A1* | 11/2009 | Kromydas | 463/29 |
| 2010/0050216 A1* | 2/2010 | Ahrens | 725/87 |
| 2010/0325243 A1* | 12/2010 | Zhang et al. | 709/219 |
| 2011/0106736 A1* | 5/2011 | Aharonson et al. | 706/12 |

FOREIGN PATENT DOCUMENTS

| | | |
|---|---|---|
| JP | 2003-157086 A | 5/2003 |
| JP | 2003-308674 A | 10/2003 |
| JP | 2005-215894 A | 8/2005 |
| JP | 2007-525759 A | 9/2007 |
| JP | 2007-538456 A | 12/2007 |
| JP | 2008-118676 A | 5/2008 |
| WO | 2005/086028 A1 | 9/2005 |

OTHER PUBLICATIONS

Keating Gina,"Media Group to create new digital video 'ecosystem'", Retrieved at<<http://www.reuters.com/article/technologyNews/idUSN12347789200800912>>, Sep. 12, 2008, 3 pages.

Ngo Tom, "Office Open XML Overview", ECMA International, 2006, 14 pages.

"China First Office Action", Mailed Date: Dec. 4, 2012, Application No. 200980141456.7, 11 pages.

"China Second Office Action", Mailed Date: Jul. 26, 2013, Application No. 200980141456.7, 6 pages.

PCT International Search Report & Written Opinion for Application No. PCT/US2009/059735, Korean Intellectual Property Office, Government Complex-Daejeon, 139 Seansa-ro, Seogu, Daejeon 302-701, Republic of Korea, Mailed on Apr. 14, 2010, 11 pages.

U.S. Appl. No. 12/480687, Non-Final Office Action, mailed Sep. 21, 2011, 12 pages.

U.S. Appl. No. 12/480,687, Response to Non-Final Office Action mailed Sep. 21, 2011, filed Dec. 20, 2011, 11 pages.

U.S. Appl. No. 12/480,687, Final Office Action, mailed Mar. 13, 2012, 12 pages.

U.S. Appl. No. 12/480,687, RCE-Response to Final Office Action mailed Mar. 13, 2012, filed Jul. 13, 2012, 16 pages.

U.S. Appl. No. 12/480,687, Non-Final Office Action, mailed Apr. 11, 2013, 11 pages.

U.S. Appl. No. 12/480,687, Response to Non-Final Office Action, mailed Apr. 11, 2013 filed May 13, 2013, 8 pages.

U.S. Appl. No. 12/480,687, Notice of Allowance, mailed May 23, 2013, 8 pages.

"Notice of Allowance in China Patent Application No. 200980141456.7", Mailed Date: Dec. 5, 2013, Filed Date: Oct. 6, 2009, 6 Pages.

"Extended European Search Report in European Patent Application No. 09821028.9", Mailed Dated: Nov. 11, 2013, Filed Date: Oct. 6, 2009, 6 Pages.

"Non-Final Rejection in Japan Patent Application No. 2011-531124", Mail Date: Sep. 2, 2013, Filed Date: Oct. 6, 2009, 9 Pages.

"Final Rejection in Japan Patent Application No. 2011-531124", Mail Date: Dec. 26, 2013, Filed Date: Oct. 6, 2009, 9 Pages.

* cited by examiner

# CONTENT PACKAGE FOR ELECTRONIC DISTRIBUTION

CROSS-REFERENCE TO RELATED APPLICATIONS

This application is a continuation of U.S. application Ser. No. 12/480,687, filed Jun. 9, 2009, which claims the benefit of U.S. Provisional Application No. 61/105,410, filed Oct. 14, 2008, the entirety of which are hereby incorporated by reference herein.

BACKGROUND

Existing systems provide generic containers for storing files. For example, file containers such as zip, tar, and cab provide a means for grouping multiple files into a single file. Video interchange formats exist for grouping media files or streams into a single file. However, after obtaining files in formats in accordance with existing systems, a computing device has to re-author or reformat the obtained files for storage or playback. Among other deficiencies, the existing systems lack a mechanism for providing a file container that can be readily modified and rendered by a user.

SUMMARY

Embodiments of the disclosure provide a content package to store, download, and play back audio and video over digital delivery systems. A first computing device retrieves a content package storing one or more media files from a second computing device. The first computing device extracts table of contents (TOC) data from the retrieved content package. The TOC data includes physical representation data corresponding to the content package and logical representation data corresponding to the contents of the package. The first computing device stores the content package based on the physical representation data, and accesses one or more of the media files using the logical representation data. The accessed media files are provided for presentation to a user of the first computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
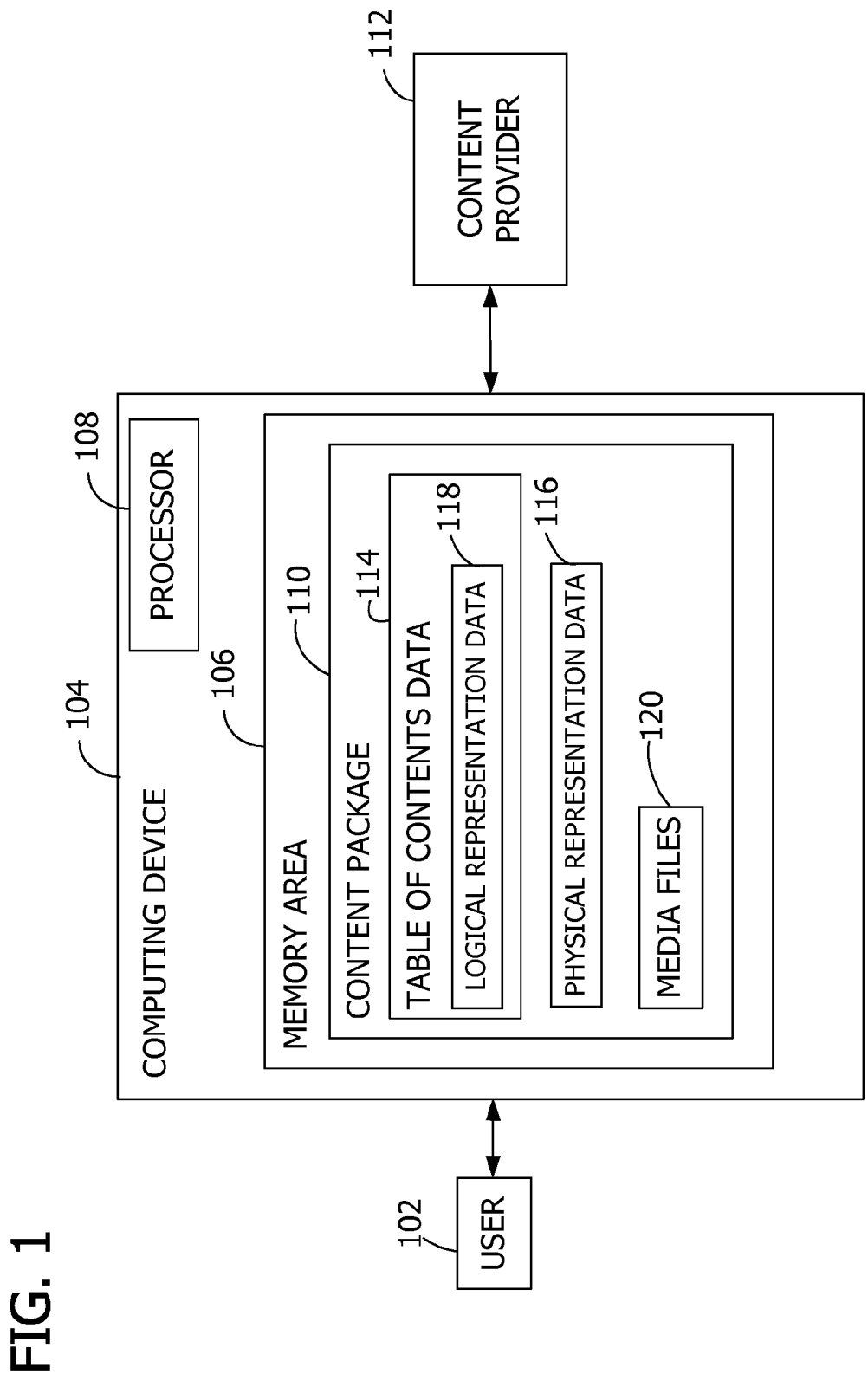
FIG. 1 is an exemplary block diagram illustrating a computing device storing a content package.

Referring to the figures, embodiments of the disclosure provide, at least, a content package 110 with media files 120 for storage and playback via a digital distribution system. The media files 120 are identified uniquely at both logical and physical levels within the content package 110 to provide both physical access to disc image files for disc recording and logical access to enable playback of the media files 120 within the disc image (e.g., without extraction).

One or more presentations including multiple works and/or multiple versions of each work may be included in the content package 110. The presentations correspond to a collection of one or more files storing different video formats, resolutions, encryption schemes, and other features. The content package 110 provides the ability to copy each presentation to the native format of a computing device 104 combined into a single file and the ability to directly play the contained media files 120 from the content package 110.

Referring again to FIG. 1, an exemplary block diagram illustrates the computing device 104 storing the content package 110. The computing device 104 includes any computing device such as, for example, a personal computer, a small notebook computer with media capability, a mobile computing device, a gaming console, cell phone, portable media player, or a digital versatile disc (DVD) player. The computing device 104 includes at least a processor 108 and a memory area 106. The processor 108 includes any quantity of processing units, and is programmed to execute computer-executable instructions for implementing aspects of the disclosure. The instructions may be performed by the processor 108 or by multiple processors executing within the computing device 104, or performed by a processor external to the computing device 104. In some embodiments, the processor 108 is programmed to execute instructions such as those illustrated in the figures (e.g., FIG. 2 and FIG. 3).

The memory area 106, or other computer-readable media, stores the content package 110. In some embodiments, the content package 110 includes one or more of the media files 120 and represents an optical disc image, while in other embodiments the content package 110 may not store any of the media files 120.

In other embodiments, the content package 110 represents, for example, a presentation comprising a collection of files for rendering to the user 102. The presentation may include one or more of the media files 120 in addition to other files such as graphics files, hypertext pages, and executable code. The files in the presentation may differ based on encoding characteristics such as bit rate, video format, aspect, resolution, encryption, and compression. The presentation may represent a basic video file set or an enhanced video file set in which the same video files are used for both presentations, but the enhanced video file set includes additional files for enhancing user interaction. In another example, the presentations represent different television episodes, different music videos, different trailers, media content with or without advertisements, extra features, songs, and the like. In a further example, the presentations include copies of the same files for redundancy or verification.

Each of the presentations may be associated with a particular configuration of a media player executing on the computing device 104. For example, the configuration of the media player is dependent on software capabilities of the media player and/or hardware support provided by the computing device 104 for the media player. In another example, some of the presentations are not executed if certain configurations of the media player are detected.

The content package 110 further includes table of contents (TOC) data 114. In the example of FIG. 1, the TOC data 114 includes logical representation data 118. The logical representation data 118 provides file-level access to the files in the content package 110 and includes a directory structure of the files. The logical representation data 118 provides logical access to the media files 120 contained in the disc image to enable playback of the media files 120. For example, the logical representation contains a directory of files and file paths to one or more files associated with an audiovisual work. The files may be internal and contained within the content package 110, or external to the content package 110 (e.g., the content package 110 includes a path to a file not stored within the content package 110). External file paths may be used to copy an external file into the content package 110, or provide streaming access to its contents during rendering of a presentation that logically includes that file.

The content package 110 further includes physical representation data 116. The physical representation data 116 provides byte-level access to the data streams in the content package 110. For example, the physical representation data 116 provides physical access to disc image file streams for disc recording.

In embodiments such as shown in FIG. 1, the physical representation data 116 is independent or separate from the logical representation data 118. For example, the physical representation data 116 results from the operation of a compression utility while the TOC data 114 contains the logical representation data 118 for the contents of the content package 110. In other embodiments, however, the physical representation data 116 and the logical representation data 118 are grouped together in the TOC data 114.

The content package 110 is identified, in some embodiments, by a compound content identifier. The compound content identifier includes a first portion identifying one or more audiovisual works represented by one or more of the media files 120. For example, the first portion is a namespace identifier such as in accordance with the International Standard Audiovisual Number (ISAN) numbering and metadata system. The compound content identifier further includes a second portion corresponding to at least one encoding characteristic of the content package 110.

In some embodiments, other data is indicated in the TOC data 114 and may be included with the content data. For example, the content package 110 includes one or more of the following: data identifying a digital rights management system associated with the content package 110, data identifying a license file for decrypting the media files 120, data identifying a system renewability message file for digital rights management system key management, data identifying a location of a license server storing licenses for access to the content package 110, and presentation files for interaction with a user 102 (e.g., menus, navigational content).

In general, the memory area 106 is associated with the computing device 104. For example, in FIG. 1, the memory area 106 is within the computing device 104. However, the memory area 106 or any of the data stored thereon may be associated with any server or other computer, local or remote from the computing device 104 (e.g., accessible via a network).

In some embodiments, the computing device 104 is associated with the user 102, and a media player application program executing on the computing device 104 renders one or more of the media files 120 from the content package 110 to the user 102. In such embodiments, the computing device 104 receives the content package 110 from a content provider 112.

Figure 2:
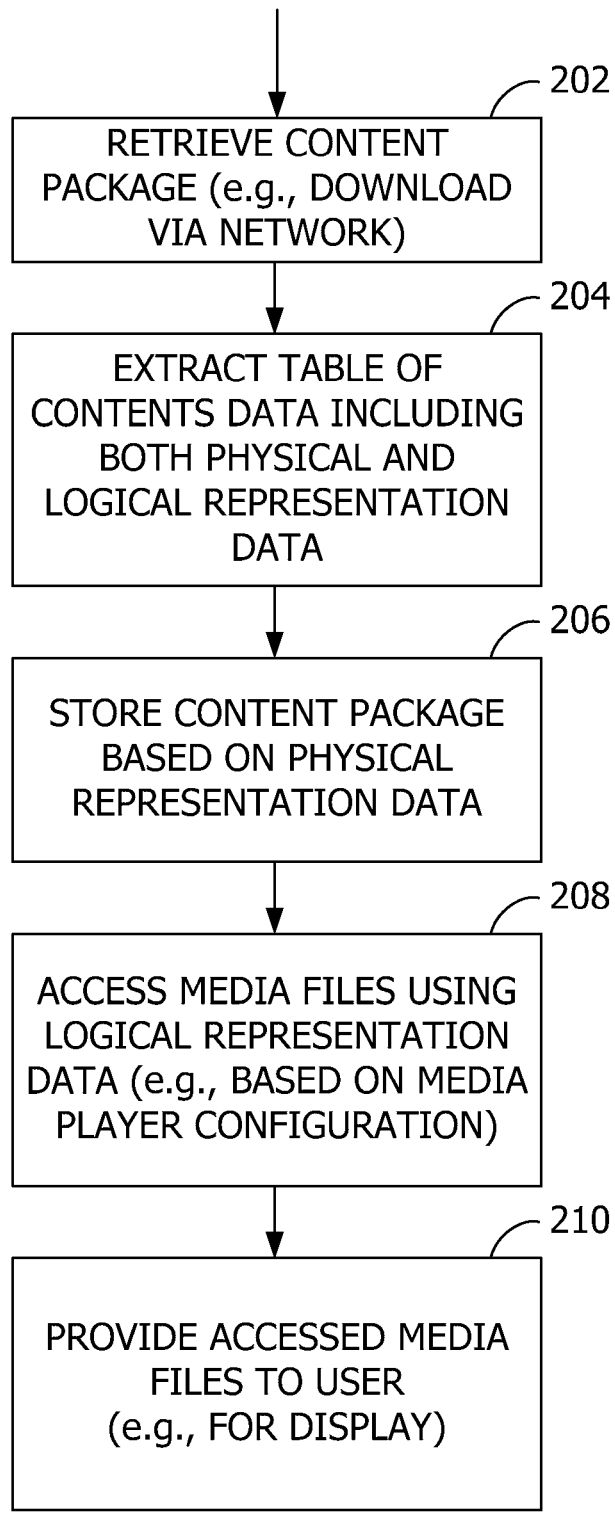
FIG. 2 is an exemplary flow chart illustrating operation of a computing device to retrieve and process the content package.

Referring next to FIG. 2, an exemplary flow chart illustrates operation of the computing device 104 to retrieve and process the content package 110. In the example of FIG. 2, the computing device 104 is associated with the user 102. However, in another embodiment, the operations illustrated and described in FIG. 2 are performed in a cloud service embodiment by one or more computing devices remote from the computing device 104 of the user 102.

At 202, the content package 110 storing the media files 120 is retrieved by the computing device 104. For example, the user 102 browses to a web site, purchases a movie, and downloads the purchased movie. At 204, the computing device 104 extracts the TOC data 114, and stores the content package 110 based on the physical representation data 116 in the content package 110 at 206. For example, the downloaded content package 110 may be stored in internal memory while the TOC data 114 is extracted, then the content package 110 is recorded onto a DVD. Alternatively or in addition, the TOC data 114 from the content package 110 may be downloaded and parsed first. The remaining data from the content package 110 is downloaded and stored in the content package 110 with a corresponding update of the physical representation of the content package 110, then recorded directly to the DVD in accordance with the physical representation data 116. For example, the recording is complete with volume directory and file information streams matching the physical sectors of the intended disc using a version directory or presentation directory for the physical image file.

At 208, the media files 120 within the downloaded content package 110 are accessed using the logical representation data 118. The files to be accessed are determined by, for example, detecting or determining a configuration of the media player on the computing device 104. For example, the configuration of the media player may be based on a software configuration of the media player and/or a hardware configuration of the computing device 104. Based on the determined configuration of the media player, the corresponding presentation and file version(s) of the media files 120 to render are selected.

In other embodiments, one or more of the presentations are identified to the user 102 for selection. The user 102 selects a desired presentation, and the media files 120 associated with the selected presentation are accessed at 208.

In some embodiments, the physical representation data 116 represents the content package 110 externally as a simple file to the computer device 104 or storage system. Internally, the physical representation data 116 (e.g., index or directory) exposes a list of files and corresponding path names, including at least the TOC file (e.g., storing TOC data 114). The list of files and corresponding path names are maintained locally when files are added or removed. Media access is initiated through the TOC file, which is created externally and not updated when files are added or removed. Rather, the location of the files may be abstracted and referenced externally or internally using the physical directory of the content package 110.

At 210, the media player plays back, renders, presents, or otherwise provides the accessed media player files to the user 102. In embodiments in which the accessed media files 120 includes presentation files for interacting with the user 102 (e.g., menus, or other navigation content), the media player reads one or more of the presentation files based on the presentation format identified in the TOC data 110 and executes instructions associated with the presentation files to provide the menu, navigational, or playback functionality to interact with the user 102. The presentation files include, for example, hypertext markup language files, extensible markup language files, metadata, script files, portable intermediate language code, binary executable application programs, and the like.

In some embodiments, the user 102 may download additional content for inclusion in or association with the content package 110 (e.g., late binding). For example, if the downloaded content package 110 includes media files associated with a television show, the user 102 may later download closed captions, subtitles, a soundtrack, foreign language tracks, or other related content. The user 102 may also download additional TOC data (e.g., a second TOC file) associated with the additional downloaded content if the presentation was not included in the TOC data 114 previously downloaded. The computing device 104 adds the additional downloaded content to the downloaded content package 110, and logically merges the second TOC data with the TOC data 114 (e.g., first TOC data) associated with the content package 110. The result is a single content package 110 with additional TOC data and referenced presentation files. In such an embodiment, the content provider 112 does not have to maintain separate media files or content packages 110, each with differing media files 120 (e.g., one with a foreign language track, one with closed captions, etc.). From the user experience perspective, the user 102 downloads only the desired additional content rather than another complete content package 110 or file, saving time, bandwidth, and other transmission costs.

The content package 110 may also be used to upload media files to and exchange media files between distribution servers in the same format used for downloading from a digital distribution systems to consumer media players.

Figure 3:
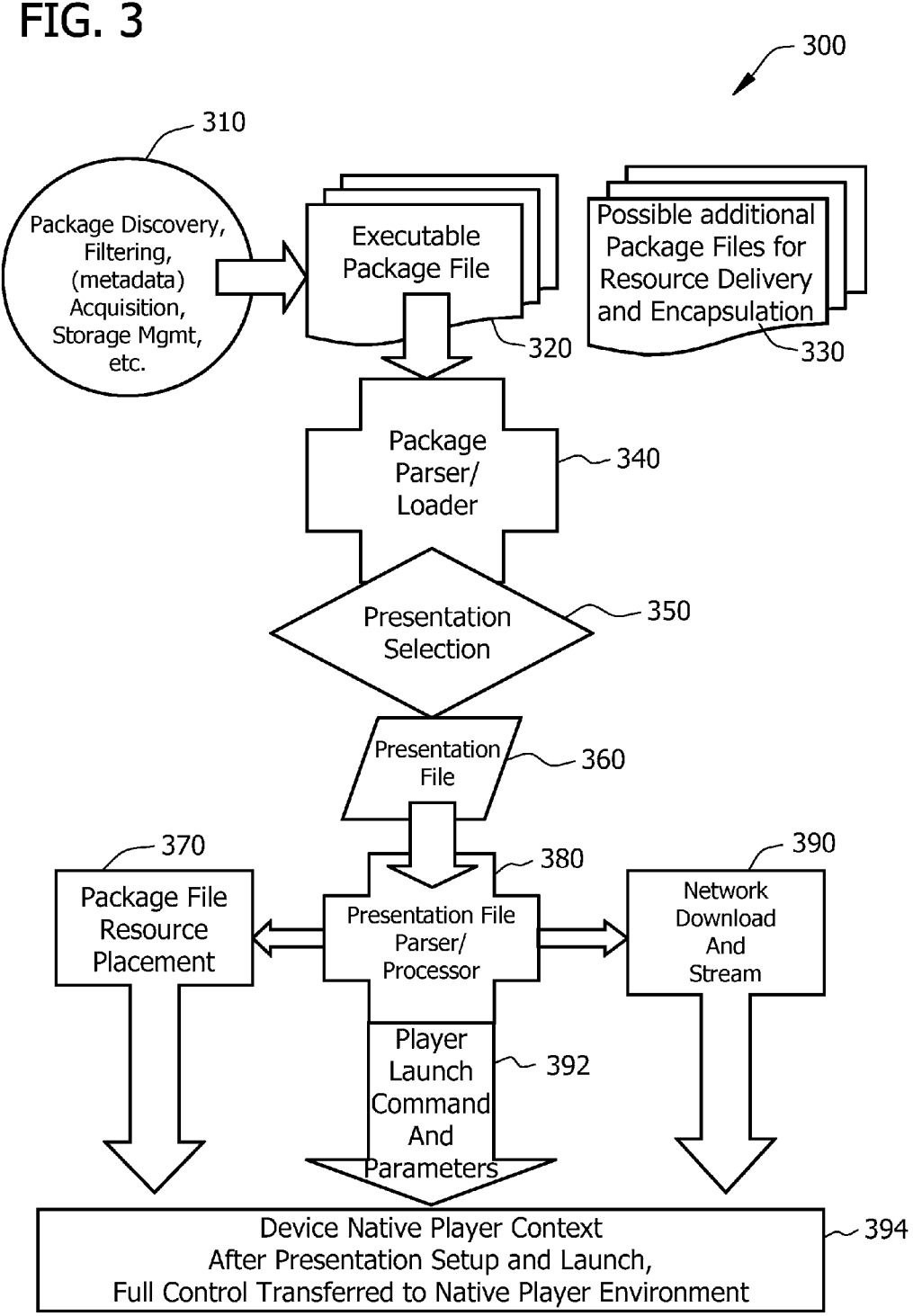
FIG. 3 is an exemplary flow chart illustrating the loading and parsing of the content package, and transfer of control to a media player.

Referring next to FIG. 3, an exemplary flow chart illustrates the loading and parsing of the content package 110, and transfer of control to the media player via flow chart 300. Discovery, filtering, or other activities are performed (e.g., by the user 102) at 310 to identify, select, and acquire at 320 a package file such as the content package 110. The package may contain a complete set of files and presentation information. TOC data in the package may list additional files not in the package, but available online for later resource delivery and encapsulation at 330. The package file may contain just a TOC file and therefore be small relative to the size of audio and video files. In this example, the distribution of a large number of packages via low capacity methods such as email attachments is practical. Consumers or the devices associated therewith may determine what large media files are desired for download.

A package parser or loader (e.g., associated with the media player) accesses the package file at 340 and performs presentation selection at 350 (e.g., selection of a set of files including at least one of the media files 120). Presentation selection occurs by matching such as with a globally unique identifier, multipurpose Internet mail extension (MIME) type, file extension, or a format identifier string (e.g., name and version number) recognized as compatible by the media player. The package parser further performs setup operations and launches playback in the media player on the computing device 104.

In the example of FIG. 3, the package file includes a presentation file (e.g., an extensible markup language document) to describe resource marshaling, player initialization, and application loading and launching at 360. In some embodiments, the presentation file includes metadata such as a list of resources, branching resource alternatives, and a launch command string. The list of resources includes package files and network (e.g., Internet) resources for launching the presentation. The presentation and listed resources may also acquire or reference other resources once launched. The branching resources include resource alternatives for the computing device 104 and user configuration such as alternative files selected by language, bit rate, resolution, codec, digital rights management, network availability and bandwidth. The resource alternatives are selected before launch, at load time, in some embodiments.

The launch string identifies the initial resource (e.g., play list or executable application program) that is used to initiate play back of the selected presentation by the media player. In some embodiments, there are more than one file and/or additional parameters in the launch string to frame launch commands. In other embodiments, the launch string is a single file name.

At 380, an application program such as a media player opens the presentation file and performs operations such as device or presentation specific setup. For example, the media player may select resources based on video resolution, language, bit rate, network connection state and speed, local storage capabilities, graphics rendering capabilities, number of decoders, codec supported, digital rights supported, and the like. The media player performs resource placement at 370 by marshalling resource files according to device-specific configuration. Some computing devices 104 load package files into a file cache for in-place access, while other computing devices 104 have storage managers that allow in-place access from package files on hard disks, and while still other computing devices 104 employ resource file extraction to native device directories, and storage systems before launch.

The marshalling of resource files includes copying network resources stored on distributed file systems, servers, and the Internet (e.g., at 390) as well as copying files contained in packages stored in those locations. A generalized uniform resource identifier (URI) syntax allows runtime resolution to actual local and network file locations (e.g., relative or absolute paths) in addition to domain name service and web resolution mechanisms, or files currently stored inside a local package or a remote package. For example, relative references may be converted to absolute references at runtime.

During the marshalling of resources, resource availability is identified, actual storage locations are resolved, network connections are established, package files are copied to runtime locations, raw files are copied to runtime locations, files are extracted from package files as appropriate (e.g., extract the resources for use prior to launch, as other resources can be resolved and acquired interactively by the presentation itself once running).

After resources have been marshaled, the player launch command is executed at 392 to transfer control to the media player. The setup file processor reads the launch string in the setup file and frames a command call appropriate for the computing device 104 and the media player to play the media. For example, the launch string is the name of a playlist or executable file (e.g., the call is framed as "RUN./filename-.exe—auto—x" in this instance).

Control transfers to the native media player and its storage management and rendering systems at 394. In the example of FIG. 3, the media player is responsible for digital rights management (DRM) protection, system revocation messages (SRM) or other files to revoke DRM keys, verification/tamper evidence, authentication, and condition access of resources. The media player uses package header fields indicating system, key, hash, and checksum. The media player and storage management are responsible for termination and cleanup of packages, resources, and the runtime environment, in some embodiments. The external content manager indicated handles library management of stored packages: deleting after play, or retaining in a library with some automatic and user controlled content management system.

Figure 4:
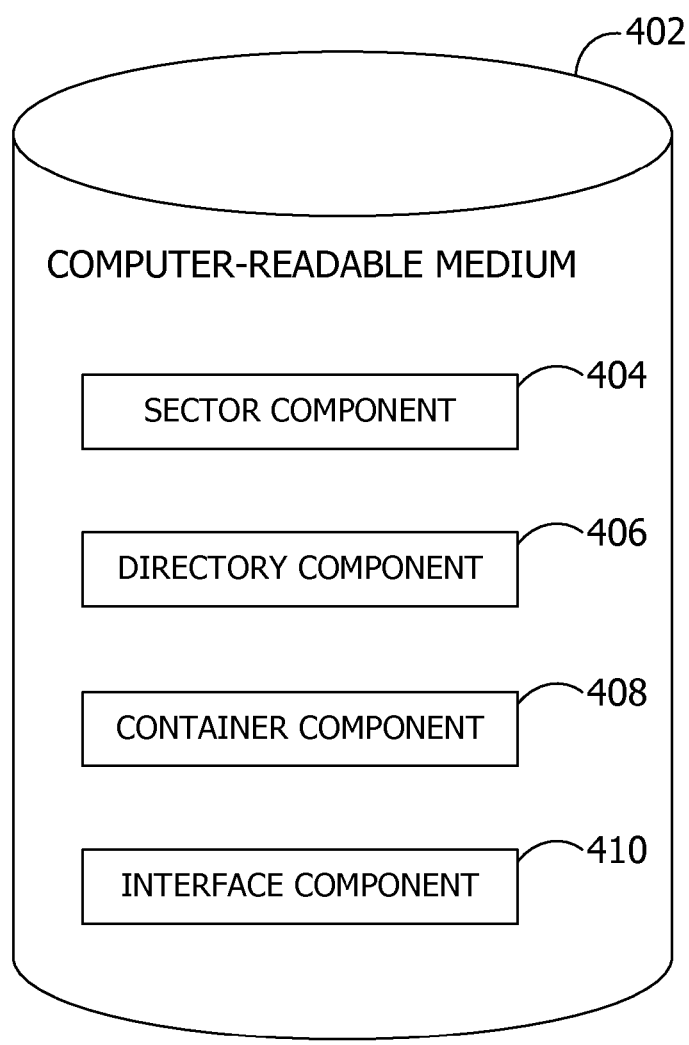
FIG. 4 is an exemplary block diagram illustrating a computer-readable medium storing components for creating the content package.

Referring next to FIG. 4, an exemplary block diagram illustrates a computer-readable medium 402 storing components for creating the content package 110. Aspects of the example of FIG. 4 are directed to a disc image file having an additional logical layer pointing to a contained file. The logical layer is essentially a file container within a file container in this example. The byte stream may be used directly for recording, but the logical reference to the files within the disc image may be used for playback.

The computer-readable medium 402, or other memory area, further stores computer-executable components for implementing aspects of the disclosure. Exemplary components include a sector component 404, a directory component 406, a container component 408, and an interface component 410. The sector component 404 determines a physical representation of a disc image, where the disc image has a plurality of the media files 120. The directory component 406 generates a logical representation of the media files 120. The container component 408 creates the content package 110 for the disc image. The content package 110 includes the media files 120, the physical representation, and the logical representation. The container component 408 further identifies encoding characteristics of the disc image, and defines a compound content identifier for the disc image based on the identified encoding characteristics and based on the logical representation of the media files 120 generated by the directory component 406.

The interface component 410 provides the content package 110 created by the container component 408 for access by the computing device 104. For example, the interface component 410 provides, or otherwise makes available, the content package 110 for download by the computing device 104 via a network such as the Internet.

Figure 5:
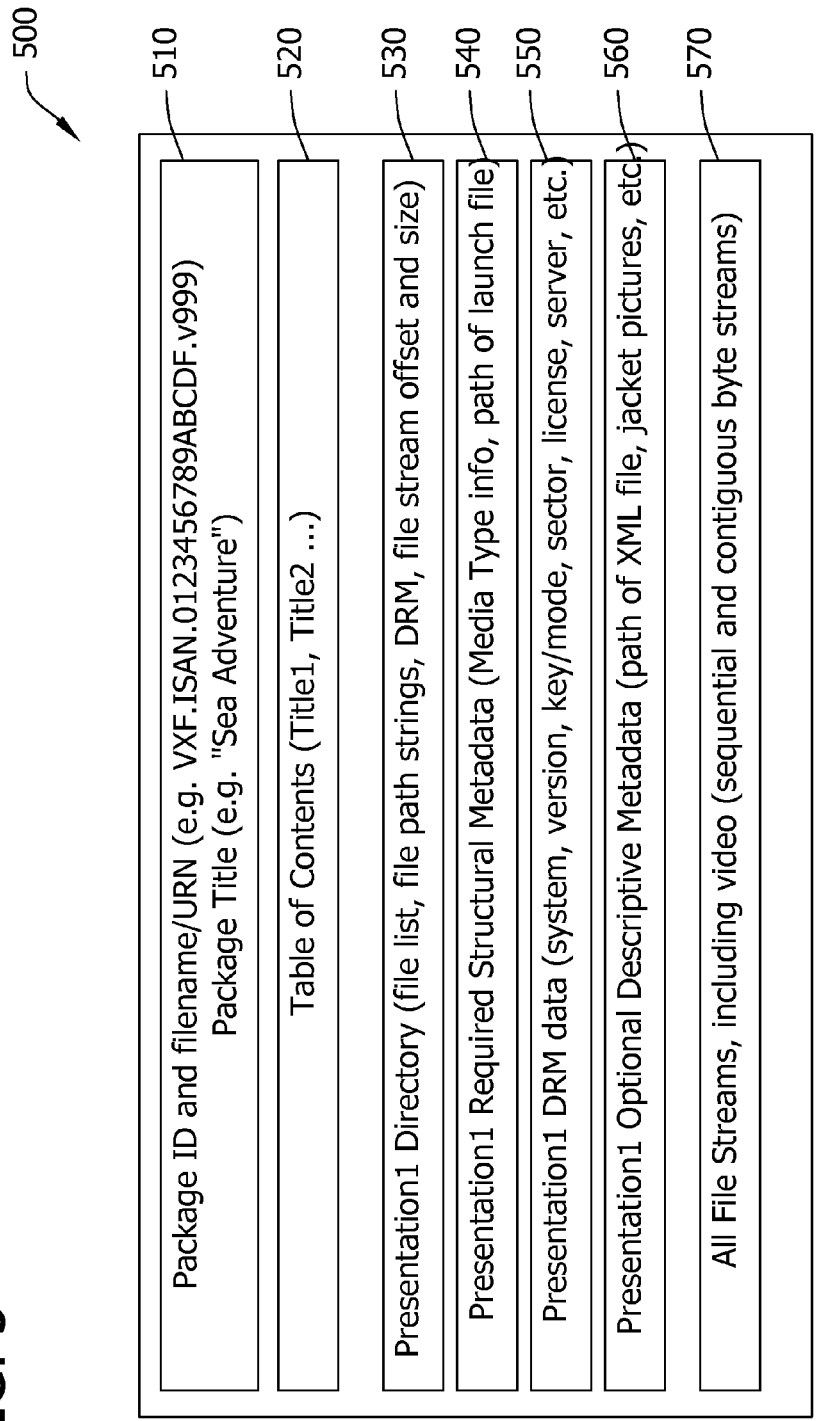
FIG. 5 is an exemplary block diagram illustrating a data structure corresponding to the content package.

Referring next to FIG. 5, an exemplary block diagram illustrates a data structure 500 corresponding to the content package 110. The data structure 500 includes the compound content identifier 510 that combines logical identification of a work (e.g., a title) that is independent of its digital encoding, plus a file identifier that represents the digital encoding characteristics such as video format, resolution, compression, encryption, etc. that are for identifying playback compatibility. A table of contents 520 is stored. Presentation1 directory information 530, structural metadata 540, digital rights management data 550, descriptive metadata 560, and the file streams 570 represents fields within the data structure 500.

In some embodiments, the data structure 500 further includes rating information for screening selection, presentations and platforms that the content package 110 runs on, a set of keywords and descriptive metadata that can be used for automatic filtering and selection (e.g., genre, style, date, and artists), extensions for authenticating and decrypting contained files, and file path information for contained files that can be used by the device storage manager for virtual or actual storage placement (e.g., portable storage) and for runtime resolution of application content references.

EXAMPLES

In one example, the content package 110 is bootable. An example boot sequence is next described. A descriptor within the content package 110 indicates that the content package 110 is bootable, and the TOC data 114 is consulted to identify the optimal presentation available for the computing device 104. The byte extent of the selected setup file is read and provided to the selected media player for execution (e.g., as a launch pointer).

The media player marshals resources by reading them from the package file, finding them locally or via a network, etc. The media player decides when to launch, follows the pointer to the initial resource, loads the resource, and executes the resource. In some cases, the media player has the "executable" code. In other cases, the initial resource is native binary, script language, markup, etc. and some linking, interpreting, or compiling takes place to control the presentation.

In some aspects of the disclosure, the content packages 110 are used to deliver resources, and lack presentations (e.g., any of the media files 120 or other files). There are resources as discrete files referenced by a manifest or script embedded in applications (e.g., some resources are listed in the manifest while others can be discovered and resolved after an application program is running) Examples include captured personal video recording (PVR) streams, ripped DVD streams, download or progressive download Internet resident stream files, and media files 120 on a local hard disk.

Some embodiments contemplate security and authentication. The individual files referenced by the TOC data 114 are hashed, signed, and/or encrypted for authentication, tamper protection, and copy protection. If digital rights management methods are supported, the TOC data 114 identifies the digital rights management method for reading the file, a signed digest to verify the file contents, and any information to link to the right certificate to authenticate the signature and optionally decrypt.

Exemplary Operating Environment

While aspects of the invention are described with reference to the computing device 104, embodiments of the invention are operable with any computing device. For example, aspects of the invention are operable with devices such as laptop computers, gaming consoles (including handheld gaming consoles), hand-held or vehicle-mounted navigation devices, portable music players, a personal digital assistant, an information appliance, a personal communicator, a hand-held television, or any other type of electronic device.

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for defining a downloadable content package 110 identifying the media files 120 therein both logically and physically, and exemplary means for defining a data structure for the content package 110 including at least the TOC data 114 and the media files 120.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for rendering a content package by a computing device, said system comprising:
    a memory area for storing the content package comprising table of contents (TOC) data, a descriptor, and one or more presentations comprising one or more media files, wherein the content package comprises a physical representation providing byte-level access to the content package, wherein the TOC data includes a logical representation providing file-level access to the content package, and wherein the descriptor indicates that the content package is bootable; and
    a processor programmed to:
        retrieve the content package on the computing device;
        store the retrieved content package in the memory area based on the physical representation of the content package;
        identify a configuration of a media player executing on the computing device;
        select one of the presentations to render based on the identified configuration and the physical representation of the content package; and
        render the selected presentation of the media files in the media player using the logical representation of the content package.

2. The system of claim 1, wherein the media player marshals resources by reading the resources from the content package.

3. The system of claim 2, wherein the resources include discrete files referenced by a manifest.

4. The system of claim 2, wherein the media player reads the resources based on at least one of: video resolution, language, bit rate, network connection state, network connection speed, local storage capabilities, graphics rendering capabilities, number of decoders, codec supported, or digital rights supported.

5. The system of claim 1, wherein the content package includes a setup file and the processor is further programmed to provide byte extent of the setup file to the media player for execution.

6. The system of claim 1, wherein the content package further includes at least one of: rating information for screening selection, or a set of keyword and metadata used for automatic filtering and selection.

7. The system of claim 1, wherein the TOC data represents a first TOC data and the processor is further programmed to:
    retrieve content and a second TOC data associated with the content;
    add the retrieved content to the content package; and
    merge the second TOC data with the first TOC data.

8. The system of claim 1, wherein the content package stored in the memory area is managed by a content manager external to the computing device.

9. The system of claim 1, wherein the processor is programmed to select the presentation by matching compatibility of the media player with at least one of the following in the content package: a globally unique identifier, a multipurpose internet mail extension (MIME) type, a file extension, or a format identifier string.

10. The system of claim 1, wherein the TOC data identifies a digital rights management method for reading the presentations, a signed digest to verify contents of the presentations, and information identifying a certificate for authentication.

11. A method comprising:
    retrieving, by a computing device, a content package comprising one or more presentation files;
    extracting table of contents (TOC) data from the retrieved content package, said content package including physical representation data providing byte-level access to the content package, said TOC data including logical representation data providing file-level access to the content package, said content package being bootable;
    storing the content package based on the physical representation data;
    accessing one or more of the presentation files using the logical representation data; and
    providing the accessed presentation files for presentation to a user of the computing device.

12. The method of claim 11, wherein the content package includes a descriptor indicating that the content package is bootable.

13. The method of claim 11, wherein each of the presentation files includes metadata comprising at least one of: a list of resources, branching resource alternatives, or a launch command string.

14. The method of claim 11, wherein providing the accessed presentation files comprises using the TOC data to identify a launch pointer for presentation to the user of the computing device.

15. The method of claim 14, wherein the launch pointer is provided to a media player for execution.

16. The method of claim 11, wherein the presentation files include at least one of: hypertext markup language files, extensible markup language files, metadata, script files, portable intermediate language code, or binary executable application programs.

17. One or more computer memories storing computer-executable instructions which, when executed by a computing device, perform actions comprising:

retrieving a content package comprising one or more presentation files, said content package being bootable;

extracting table of contents (TOC) data from the retrieved content package, said content package including physical representation data providing byte-level access to the content package, said TOC data including logical representation data providing file-level access to the content package;

accessing one or more of the presentation files using the logical representation data; and providing the accessed presentation files for presentation to a user of the computing device.

18. The computer memories of claim 17, wherein the retrieved content package includes a descriptor indicating that the content package is bootable.

19. The computer memories of claim 17, wherein providing the accessed presentation files comprises using the TOC data to identify a launch pointer for presentation to the user of the computing device.

20. The computer memories of claim 19, wherein the launch pointer identifies an initial resource to initiate playback of the provided presentation files.

\* \* \* \* \*